March 29, 1960     H. H. KOPPEL     2,930,956
ANTI-HUNT ELECTRICAL MEASURING SYSTEM
Filed Feb. 25, 1957     2 Sheets-Sheet 1

INVENTOR.
HAROLD H. KOPPEL
BY Arthur L. Wade
ATTORNEY

March 29, 1960 H. H. KOPPEL 2,930,956
ANTI-HUNT ELECTRICAL MEASURING SYSTEM
Filed Feb. 25, 1957 2 Sheets-Sheet 2
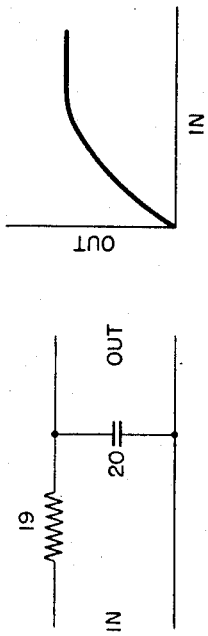
Fig. 2
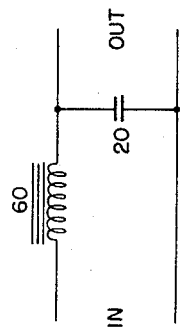
Fig. 3
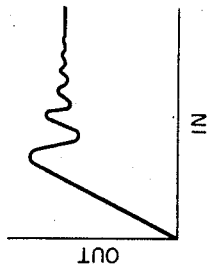
Fig. 4
Fig. 5
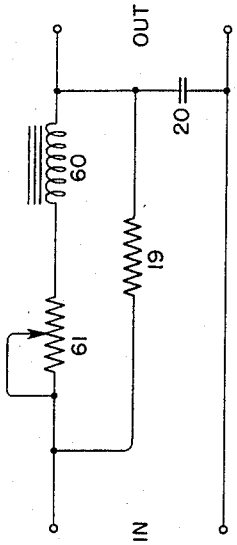
Fig. 6
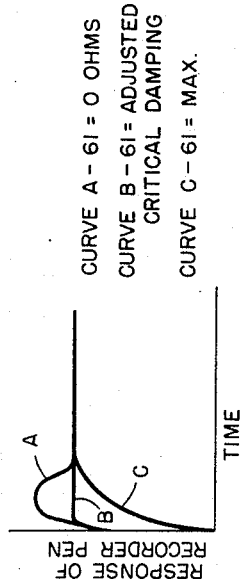
CURVE A - 61 = 0 OHMS
CURVE B - 61 = ADJUSTED FOR CRITICAL DAMPING
CURVE C - 61 = MAX.
Fig. 7
INVENTOR.
HAROLD H. KOPPEL
BY
ATTORNEY

United States Patent Office 2,930,956
Patented Mar. 29, 1960

2,930,956

ANTI-HUNT ELECTRICAL MEASURING SYSTEM

Harold H. Koppel, South Euclid, Ohio, assignor to Bailey Meter Company, a corporation of Delaware Application February 25, 1957, Serial No. 642,286

9 Claims. (Cl. 318—28)

This invention relates to feedback systems for electro-mechanical servo measuring systems.

Electro-mechanical servo measuring systems are broadly defined as structure for measuring and/or controlling the magnitude of a variable, such as temperature, pressure, rate of fluid flow, position or displacement, although the variable may be of any chemical, physical, electrical, thermal or other characteristic. Variations in the variable quantity, quality, or condition are translated into variations in an electrical effect, and this effect is then amplified solely through electrical means until sufficient power is available for doing useful work, such as moving an indicator or other exhibiting means, or for regulating the rate of application of an agent contributing to the production or maintenance of the variable. Therefore, it can be seen that the useful work is usually produced as the mechanical motion of an electro-mechanical servo motor whose rotation is controlled by a balanceable electric network responsive to the variable. The translation from electrical effect into mechanical motion, for both rebalancing the electrical network and doing the useful work, raises the problem of unsatisfactory response by the motor to the control signals sent to it.

By problems of unsatisfactory response, is meant those frequency response characteristics of the entire system which form a basis of comparison between electro-mechanical servo measuring systems of various types. Electrical signals applied to the control windings of a motor may cause the motor to respond so quickly that the inertia of the motor rotor will cause oscillations, with obvious detrimental effects on manifestation and control. Convenient means for adjusting the sensitivity of the motor to a change in the variable to which the entire system is responsive forms a problem met by the present invention.

The preferred embodiment of the invention is disclosed in association with a self-balancing potentiometer measuring system wherein the output of the potentiometer, as an unbalance D.-C. voltage, is inverted into an A.-C. voltage of one phase, or of opposite phase, depending upon the sense of unbalance of the potentiometer circuit. Structure is provided for amplifying the A.-C. voltage and applying it to the drive circuit of an electric reversing motor in order that the motion of the motor will rebalance the potentiometer circuit and simultaneously operate indicating, recording and/or control mechanisms. The system may be applied to the measurement of a specific condition and operate a control mechanism which regulates that condition, or some other condition.

It is the primary object of the invention to provide a new and useful measuring apparatus which accomplishes its functions in an improved manner. The improved results are accomplished by the invention as embodied in the circuit providing feedback signals derived from the motor position in modifying the signals coming from the primary element to which the system responds.

More particular, an object of this invention is to provide means for deriving a feedback signal from a servo motor position and adjusting the amount of the signal used to modify the input to the system from its primary element.

A still more specific object of the invention is to provide a circuit for an electro-mechanical servo measuring system which is a second derivative of the servo motor position and to simultaneously provide adjustment for the resistance-capacitor characteristics of the input circuit of the servo measuring system.

In the drawings:

Figs. 2–7 are equivalent circuits of the practical embodiment of the invention and curves illustrating response of the system.

Figure 1:
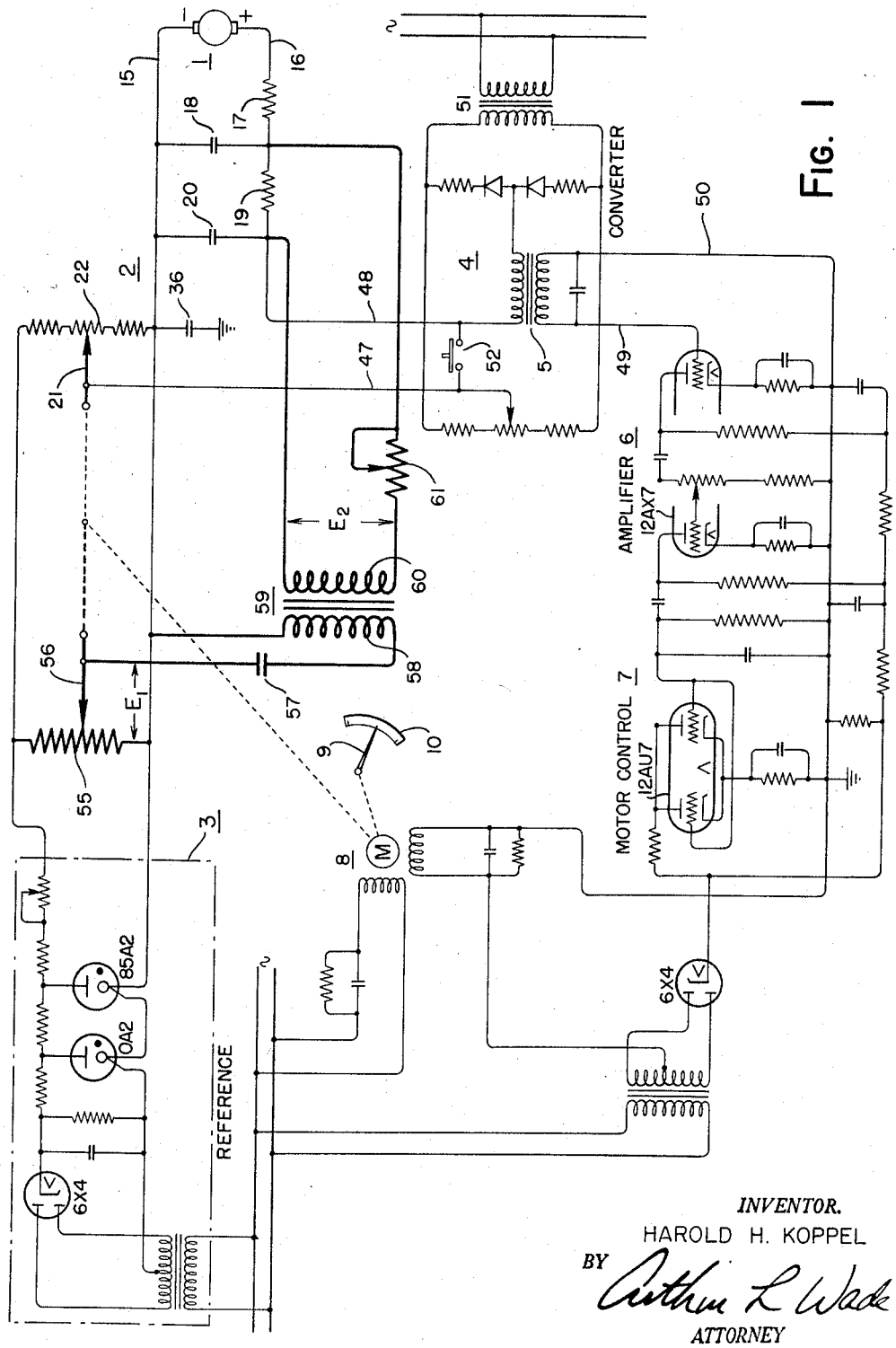
Fig. 1 is a schematic illustration of a complete self-balancing potentiometer measuring system with a circuit including an embodiment of the invention.

The description begins with directing attention to the system of Fig. 1 responsive to a variable condition and producing a unidirectional electromotive force in accordance with the magnitude of that condition. The specific embodiment illustrated discloses a tachometer generator whose rotation produces the unidirectional E.M.F. proportional to the speed of tachometer rotation. It is the output of this tachometer generator 1 which ultimately determines the positioning of an electric reversing motor. The motion of positioning may be caused to actuate a control system influencing rotation of the tachometer generator and/or simultaneously exhibit the magnitude of the speed of rotation of the tachometer.

The output of generator 1 is compared with a constant E.M.F. in potentiometric balancing network 2. Source 3, for the constant reference voltage, is provided as a reference for the D.-C. output potential of tachometer 1. The resultant voltage, formed by the unbalance network 2, is inverted by network 4 and applied to the primary of transformer 5.

Transformer 5 functions as a part of the circuit of network 4 to invert the D.-C. voltage output of potentiometer network 2 into an A.-C. voltage. The A.-C. voltage output of transformer 5 is amplified by the two stages of an electronic amplifier 6. The amplified A.-C. voltage is applied to motor drive circuit 7 to direct the rotation of motor 8 in its mechanical positioning of a balancing adjustable resistance in network 2 and simultaneous actuation of a manifesting member as disclosed at 9.

The manifesting member 9 may be a recording and/or indicating pen moving over the surface of a chart and/or cooperating with a scale 10, as disclosed. The self-balancing characteristic of the system is apparent in the balancing of network 2. Thus, for every magnitude of the speed of rotation of generator 1, the system drives reversing motor 8 to bring about the internal electrical balance of the system and to externally position either the indicating and/or recording member 9 and/or a mechanism which affects the speed of rotation of the generator 1. The actual illustration of control mechanism which could be actuated by motor 8 has not been disclosed as being superfluous to the present disclosure.

The foregoing description has broken the measuring system into separate sections which may be considered individually. The initial section is the circuit immediately assocated with generator 1. The negative and positive leads of the generator are designated 15 and 16. These leads may, in a broad view, be said to include network 2, inverting network 4 and the primary of transformer 5 in series.

The susceptibility of leads 15 and 16, in this type of measuring system, to stray A.-C. voltage pick-up is well known. A two-stage filter has been utilized to attenuate any A.-C. voltage appearing across input leads 15 and 16.

Resistance 17 and capacitor 18 form a first stage of filtering while resistance 19 and capacitor 20 form a second stage of filtering. The A.-C. voltages, which may be applied to leads 15 and 16, may be regarded as caused to circulate in the series circuit formed by generator 1, resistance 17, capacitor 18 and leads 15 and 16. Should the A.-C. voltages penetrate beyond this first stage circuit they may be circulated by the second stage circuit formed of generator 1, resistance 19, capacitor 20 and leads 15 and 16. In either event, the A.-C. voltage is circulated and its passage into the measuring circuit, an ultimate influence on the driving of motor 8, is minimized by these two stages of R-C components.

Potentiometer balancing network 2 is of the conventional form found in measuring systems of this type. A portion of the unidirectional E.M.F.'s of constant magnitude is compared to the output of generator 1. Slidewire 22 has the output of source 3 applied across it and the movement of brush 21 selects a portion of its voltage drop to equal the generator 1 output. As the output of generator 1 varies, a difference in the E.M.F.'s appear. The difference between the known and the unknown E.M.F.'s appears alternately, across the primary of transformer 5. The difference is reduced to substantially zero when motor 8 is driven to position brush 21 along slidewire 22 in network 2.

Source 3 may be specifically described as a two-cascade electronic reference source which will require standardization no more than once in six weeks. The characteristics of the Type 6X4, a Type 0A2 and a Type 85A2 tube are utilized in the circuit. This circuit, including these tubes, delivers an extremely stable potential against which unknown potentials may be compared in network 2. Source 3 is similar to the source of reference voltage disclosed in United States Patents Nos. 2,806,193 and 2,835,-855 which issued September 10, 1957 and May 20, 1958 respectively.

Before proceeding, attention is directed to the indication of a line supply for referenece source 3. Similar designations are carried in association with inverter bridge 4, motor drive circuit 7 and the motor 8. It is for the convenience of illustration that these lines supplying designations have been separated in the disclosure of the embodiment. In an actual reduction to practice, the transformers are physically unified in order that one primary winding may supply the required number of secondary windings servicing the various components of the system. Note also that capacitor 36 has been provided to give an A.-C. ground connection to the measuring network 2.

Attention may now be generally directed to inverter 4. This inverter represents a material advance over the art in that it has no moving parts, is extremely simple and relatively inexpensive and has infinite life. Essentially, it comprises four precision resistors, an adjustable potentiometer and two silicon conjunction diodes. This device may be functionally compared with the mechanical chopper.

The network 2 output voltage between leads 47 and 48, becomes the input signal to the inverter 4. The voltage between leads 49 and 50 is the inverter output signal, and that applied to amplifier 6. The inverter is excited from secondary of transformer 51, having a primary connected to line supply. Note is to be made that no point, in the measuring circuit or input circuit, is conductively coupled to ground. This permits the source of variable E.M.F. to be either grounded or left ungrounded, as conditions may warrant.

Null-check push button 52 is included for checking the stability of bridge 4. When this push button is manually closed, the input to the inverter 4 is shunted and the output of the circuit of inverter 4 can be observed for unbalance. If an unbalance appears, the null-stabilizing adjustment in the inverter can eliminate the unbalance.

Network 6 may, specifically, take the form of similar disclosure Hornfeck 2,544,790. A dual-triode type 12AX7 tube characterizes the network 6. Each section of the triode has as its plate supply filtered, rectified, D.-C. voltage. The output voltage between the leads 49 and 50 is applied to the grid of the first section of the triode and a portion of the amplified output is applied to the grid of the second section. The amplified output of the second section is applied to motor control circuit 7.

Motor drive circuit 7 is also similar to disclosure of Hornfeck 2,544,790. A loop circuit is formed of a Type 12AU7 tube, a rectifier Type 6X4 tube and a motor control winding. The amplified voltage output of 6 is applied to the grids of the Type 12AU7 tube and forms an A.-C. voltage of essentially line frequency. A capacitor tunes the motor winding to the line frequency component of the A.-C. voltage in its circuit to direct the rotation of motor 8. A reference motor winding has its voltage shifted 90° with respect to the line voltage by a capacitor to drive motor 8 under the well-known principles of capacitor-run motors. The rotation of motor 8 is utilized to position brush 21 along slidewire 22 to balance network 2. Simultaneously, this mechanical motion may be utilized to actuate exhibiting member 9 along scale 10, as well as other devices for control of conditions to which generator 1 is responsive.

The circuit described to this point is utilized in D.-C. potentiometric recorders using any speed of balancing motor, and hence any pen speed across chart. Speed of the motor is changed by changing a gear box which is mounted integrally with the motor. Because of the dynamics of the motor and balancing system, however, it is desirable on high speed recorders (one second across chart or less) to include an additional circuit to dampen the balancing action of the pen.

In all recording units having balancing speeds lower than one second across chart, a torsional spring is used between the slidewire disc and motor shaft to take up any backlash in the motor or external gear box. Since the motor and gear box always have approximately the same power output in watts, the torque at low pen speeds will be very high, so that the backlash spring imposes only a negligible bias on the motor rotation. If, however, the pen speed is high, such as one second across chart, the effective torque produced with the same amplifier as used with the lower speed unit will be comparatively low. This lower useful torque will result in a situation where the backlash spring torque will be so high as to cause the motor, on a step change, to run in one direction in a rate slightly faster than the other. This effect is undesirable, for example, when the recorder is being used for critical test work. In frequency response analysis this would cause a distortion of the frequency response curve in that when sinusoidal signals of different frequencies are applied to the input of the recorder, the average D.-C. level, or zero level of the sinusoid will change. If the backlash spring is omitted, the pen will move up-scale and down-scale at the same speed; however, any backlash in the motor or step-down gearing system will cause a dead zone to be present, resulting in overshoot of the pen which manifests itself as a distortion of the frequency response characteristics.

The present invention has been evolved to obviate the backlash spring without causing overshoot of the pen, resulting in almost "dead beat" balancing. The invention has been embodied in a simple circuit which makes use of second derivative feedback using a signal obtained from a slidewire actuated by motor 8.

Referring again to Fig. 1, the feedback slidewire 55 is shown as connected across the reference supply 3. From another view, slidewire 55 shunts slidewire 22. The voltage between the bottom of the feedback slidewire 55 and its brush 56 is thus directly proportional to the position of the motor. This voltage $E_1$ is then applied through a capacitor 57 to primary winding 58 of isolating transformer 59. The result is the production of voltage E2 across secondary 60 which is the second derivative of the motor position. Voltage $E_2$ is then applied across resistor 19 of the input filter through feedback adjusting resistor 61, causing elimination of overshoot of the motor and gear box. The isolating transformer secondary 60 has a comparatively high inductance, the transformer being wound with many turns of wire around a high permeability core material, mu-metal. The input filter is so designed that without feedback the balancing of the motor is slightly over damped. The inductance of transformer 59, in cooperation with the filter capacitors, then acts to produce either under damping or over damping, depending on the resistance of the feedback adjustment 61. A setting of resistance 61 can be made to virtually eliminate over or undershoot. When under damping is desired, this under damping occurs at a low frequency, determined by the size of the inductance and the capacitors. Thus, two actions are produced: That of the second derivative of the motor position to eliminate the relatively high frequency oscillations due to backlash; and the adjustment of overshoot by varying the effective Q of the resonant circuit formed by the filter capacitor and transformer inductance.

Formulating a mathematical analysis of the disclosed embodiment of the invention, the assumption is first made that the capacitive reactance $C_1$ of capacitor 57 is large compared to the inductive reactance of primary 58 of transformer 59 and the circuit resistance. Then, a start is made with equation:

$$E_1 = K\theta \qquad (0)$$

where
$K$ = constant
$\theta$ = motor position therefore, from the above assumption:

$$i = C_1 \frac{dE_1}{dt} \qquad (1)$$

which is to say the current ($i$) flowing into a capacitor ($C_1$) is the product of the capacitance of that capacitor and the rate of change of the voltage $$\left(\frac{dE_1}{dt}\right)$$

or the first derivative of the voltage with respect to time.

We can then make a second assumption. The assumption is that the core of transformer 59 has a constant permeability. This is expressed mathematically by:

$$i = K_2 \phi \qquad (2)$$

where
$K_2$ = constant
$\phi$ = flux of transformer 59 core

Therefore, Equation 2 can be substituted in Equation 1 to result in:

$$K_2 \phi = C_1 \frac{dE_1}{dt} \qquad (3)$$

now, as $$E_2 = N\frac{d\phi}{dt} \qquad (4)$$

where $N$ = number of turns of transformer secondary 60. A substitution of Equation 3 in 4 results in:

$$E_2 = \frac{NC_1}{K_2} \frac{d^2 E_1}{dt^2} \qquad (5)$$

Therefore, substituting Equation 0 in 5 results in:

$$E_2 = \frac{NC_1 K}{K_2} \frac{d^2 \theta}{dt^2}$$

Mathematically, these equations demonstrate that the feedback voltage applied to the measuring circuit across resistor 19 is proportional to the second derivative of the motor position, or the first derivative of the motor speed.

The effect of this second derivative feedback signal on the motor response can be evaluated if it is assumed that without the feedback signal the motor motion is of a high frequency nature, determined by the dynamics (inertia, damping factor, etc.) of the system. This motion can be considered, to a good approximation, to be sinusoidal. Let there be added now a feedback voltage proportional to the second time derivative of the motor motion. Since $$\frac{d^2 (\sin wt)}{dt^2} = -w^2 \sin wt$$

showing that the second derivative of a sine wave is proportional to the negative of the sine wave, the electrical equivalent of the negative of the motor motion is effectively impressed upon the input circuit, resulting in a cancellation of the torques producing motor oscillation.

The effect of utilizing the inductance of secondary 60 to vary the overshoot or undershoot can be derived from the following analysis. The structure of capacitor 20, resistance 19 and transformer secondary 60 inductance $L_2$ functions to produce the varying overshoot.

This part of the analysis begins with a consideration of resistance 19 being adjusted to have the predominating effect on the circuit, as compared to the effect of $L_2$.

The transfer function will then be expressed by $$\frac{Eo}{Ei}(jw) = \frac{1}{1 + jwR_2 C_2}$$

This circuit is represented by Fig. 2 and its transient response is demonstrated by the curve of Fig. 3.

Next consider resistance 19 to be minimized and $L_2$ therefore predominate. Fig. 4 represents this circuit modification. Fig. 5 represents the transient response of this circuit.

The transfer function of the Fig. 4 is then expressed by $$\frac{Eo}{Ei}(jw) = \frac{1}{1 + j^2 w^2 L_2 C_2}$$
$$= \frac{1}{1 - w^2 L_2 C_2}$$

This expression shows that at the frequency $$w = \sqrt{\frac{1}{L_2 C_2}}$$

the output is completely oscillatory and severe overshoot occurs, as demonstrated by the curve of Fig. 5. Of course, this mathematical expression and curve are theoretical because there is some resistance in the secondary 60. Therefore, the motor oscillation ultimately does die out. Direct control of the motor response between the two extremes is attained by adjustment of the resistance potentiometer 61.

Potentiometer 61 becomse the means for varying the amount of inductance shunted across 19, thus changing the overshoot or undershoot as desired. Fig. 6 shows the circuit schematically and Fig. 7 shows the limits of motor response.

What I claim as new and desire to secure by Letters Patent of the United States, is:

1. A balanceable electric network including,

A source of variable electromotive force to be measured,

A motor adapted to operate in accordance with the magnitude of the force,

Means responsive to the electromotive force in producing a control voltage for the motor, First means positioned by the motor to balance the network following an unbalance thereof caused by a variation in the electromotive force, Second means positioned by the motor to establish a first voltage proportional to motor position, A first circuit responsive to the first voltage to produce a second voltage proportional to the second time derivative of the motor position, And a second circuit including the second voltage in series with the source of variable E.M.F. to be measured.

2. The network of claim 1 in which,

The first means positioned by the motor includes a first potentiometer energized from a source of constant potential, And the second means includes a second potentiometer shunting the first potentiometer.

3. The network of claim 2 in which the first circuit responsive to the first voltage includes a capacitor and transformer connected in series.

4. The network of claim 3 in which the second circuit including the second voltage in series with the variable source also includes the transformer of the first circuit and a resistance which is arranged in series with the source of variable electromotive force.

5. A balanceable electric network including,

A source of variable electromotive force to be measured,

A motor adapted to operate in accordance with the magnitude of the force,

First means responsive to the magnitude of the force to produce a control voltage for the motor, Second means positioned by the motor to balance the network following an unbalance thereof caused by a variation of the electromotive force, An R-C filter circuit between the source of variable electromotive force and the first means responsive to the variable electromotive force, Third means positioned by the motor to establish a first voltage proportional to motor position, A first circuit responsive to the first voltage to produce a second voltage proportional to the second time derivative of the motor position, And a second circuit containing an inductance and including the second voltage in series with the source of variable electromotive force to be measured, the inductance being simultaneously in circuit with a resistance of the R-C filter.

6. The network of claim 5 in which the second and third means each include a potentiometer, The R-C filter circuit is a two stage series of R-C components, And the first circuit includes a capacitor and transformer primary in series.

7. The network of claim 6 in which the inductance is that of the secondary of the transformer, and the resistance is that of the second stage of the R-C filter.

8. The network of claim 7 in which the second circuit includes an adjustable potentiometer in series with the transformer secondary and the R-C filter second stage resistance.

9. A balanceable electric network including, a source of variable electromotive force to be measured, a motor adapted to operate in accordance with the magnitude of the electromotive force, first means responsive to the magnitude of the electromotive force to produce a control voltage for the motor, second means positioned by the motor to balance the network following an unbalance thereof caused by a variation of the electromotive force, an R-C filter circuit between the source of variable electromotive force and the first means responsive to the variable electromotive force, third means positioned by the motor to establish a first voltage proportional to motor position, a transformer having a primary and a secondary winding, a first circuit responsive to the first voltage and including a capacitor and the primary winding of said transformer in series, and a second circuit including the secondary winding of said transformer and a resistance of said R-C filter circuit.

References Cited in the file of this patent

UNITED STATES PATENTS

| | | |
|---|---|---|
| 2,088,654 | Hull | Aug. 3, 1937 |
| 2,233,415 | Hull | Mar. 4, 1941 |
| 2,452,609 | Somers et al. | Nov. 2, 1948 |
| 2,494,876 | Hornfeck | Jan. 17, 1950 |
| 2,584,954 | Williams | Feb. 5, 1952 |
| 2,745,067 | True et al. | May 8, 1956 |